(12) United States Patent
Elliott

(10) Patent No.: US 7,668,083 B1
(45) Date of Patent: Feb. 23, 2010

(54) SYSTEMS AND METHODS FOR FORWARDING DATA IN A COMMUNICATIONS NETWORK

(75) Inventor: Brig Barnum Elliott, Arlington, MA (US)

(73) Assignee: BBN Technologies Corp., Cambridge, MA (US)

( * ) Notice: Subject to any disclaimer, the term of this patent is extended or adjusted under 35 U.S.C. 154(b) by 1082 days.

(21) Appl. No.: 10/694,968

(22) Filed: Oct. 28, 2003

(51) Int. Cl.
*G01R 31/08* (2006.01)

(52) U.S. Cl. ...................... 370/223; 370/216

(58) Field of Classification Search ......... 370/216–228, 370/242–246
See application file for complete search history.

(56) References Cited

U.S. PATENT DOCUMENTS

| | | | |
|---|---|---|---|
| 4,718,002 A | 1/1988 | Carr | |
| 4,827,411 A | 5/1989 | Arrowood et al. | |
| 5,079,767 A | 1/1992 | Perlman | |
| 5,093,824 A | 3/1992 | Coan et al. | |
| 5,117,422 A | 5/1992 | Hauptschein et al. | |
| 5,175,843 A | 12/1992 | Casavant et al. | |
| 5,243,592 A | 9/1993 | Perlman et al. | |
| 5,412,654 A | 5/1995 | Perkins | |
| 5,430,729 A * | 7/1995 | Rahnema | 370/409 |
| 5,541,912 A | 7/1996 | Choudhury et al. | |
| 5,649,119 A | 7/1997 | Kondoh et al. | |
| 5,742,820 A | 4/1998 | Perlman et al. | |
| 5,764,895 A | 6/1998 | Chung | |
| 5,828,835 A | 10/1998 | Isfeld et al. | |
| 5,850,592 A | 12/1998 | Ramanathan | |
| 5,878,095 A | 3/1999 | Kainulainen et al. | |
| 5,881,246 A | 3/1999 | Crawley et al. | |
| 5,884,040 A | 3/1999 | Chung | |

(Continued)

FOREIGN PATENT DOCUMENTS

EP         0447725        9/1991

(Continued)

OTHER PUBLICATIONS

Nick McKeown, "A Quick Tutorial on IP Router Design", *Optics and Routing Seminar*, Oct. 10, 2000.

(Continued)

*Primary Examiner*—Phuc H Tran
(74) *Attorney, Agent, or Firm*—Ropes & Gray LLP

(57) ABSTRACT

A communications network (100) includes at least one control station (160) and a group of network nodes (110, 120, 140). The at least one control station (160) generates batches of forwarding tables (300), where each batch of forwarding tables (300) includes a primary forwarding table (305) and a group of backup forwarding tables (310), and forwards the batches of forwarding tables (300). Each of the network nodes (110, 120, 140) is associated with one or more outbound and inbound links and is configured to receive a batch of forwarding tables (300) from the at least one control station (160) and install the primary forwarding table (305) from the batch (300) as a current forwarding table. Each network node (110, 120, 140) is further configured to detect that a quality of one of an outbound and inbound link has changed, generate a message (900) instructing other nodes of the group of network nodes (110, 120, 140) to switch to a backup forwarding table (310) in response to detecting the quality change, and transmit the message (900) to the other nodes.

47 Claims, 10 Drawing Sheets

U.S. PATENT DOCUMENTS

| | | | |
|---|---|---|---|
| 5,903,735 A | 5/1999 | Kidder et al. | |
| 5,913,921 A | 6/1999 | Tosey et al. | |
| 5,959,989 A | 9/1999 | Gleeson et al. | |
| 5,960,047 A | 9/1999 | Proctor, Jr. et al. | |
| 5,974,327 A | 10/1999 | Agrawal et al. | |
| 6,000,011 A | 12/1999 | Freerksen et al. | |
| 6,028,857 A | 2/2000 | Poor | |
| 6,032,190 A | 2/2000 | Bremer et al. | |
| 6,067,301 A | 5/2000 | Aatresh | |
| 6,069,895 A | 5/2000 | Ayandeh et al. | |
| 6,088,622 A | 7/2000 | Dollin et al. | |
| 6,088,734 A | 7/2000 | Marin et al. | |
| 6,092,096 A | 7/2000 | Lewis et al. | |
| 6,094,435 A | 7/2000 | Hoffman et al. | |
| 6,122,753 A * | 9/2000 | Masuo et al. | 714/4 |
| 6,139,199 A | 10/2000 | Rodriguez | |
| 6,151,308 A | 11/2000 | Ibanez-Meier et al. | |
| 6,173,324 B1 | 1/2001 | D'Souza | |
| 6,215,765 B1 | 4/2001 | McAllister et al. | |
| 6,216,167 B1 | 4/2001 | Momirov | |
| 6,252,856 B1 | 6/2001 | Zhang | |
| 6,262,976 B1 | 7/2001 | McNamara | |
| 6,272,567 B1 | 8/2001 | Pal et al. | |
| 6,275,492 B1 | 8/2001 | Zhang | |
| 6,304,548 B1 | 10/2001 | Shaffer et al. | |
| 6,310,883 B1 | 10/2001 | Mann et al. | |
| 6,330,459 B1 | 12/2001 | Crichton et al. | |
| 6,349,091 B1 | 2/2002 | Li | |
| 6,362,821 B1 | 3/2002 | Gibson et al. | |
| 6,385,174 B1 | 5/2002 | Li | |
| 6,385,673 B1 | 5/2002 | DeMoney | |
| 6,396,814 B1 | 5/2002 | Iwamura et al. | |
| 6,418,299 B1 | 7/2002 | Ramanathan | |
| 6,470,329 B1 | 10/2002 | Livschitz | |
| 6,473,421 B1 | 10/2002 | Tappan | |
| 6,473,434 B1 | 10/2002 | Araya et al. | |
| 6,496,510 B1 | 12/2002 | Tsukakoshi et al. | |
| 6,542,469 B1 | 4/2003 | Kelley et al. | |
| 6,594,268 B1 | 7/2003 | Aukia et al. | |
| 6,628,929 B1 | 9/2003 | Nomura et al. | |
| 6,631,136 B1 | 10/2003 | Chowdhury et al. | |
| 6,633,544 B1 | 10/2003 | Rexford et al. | |
| 6,671,819 B1 | 12/2003 | Passman et al. | |
| 6,683,885 B1 | 1/2004 | Sugai et al. | |
| 6,687,781 B2 | 2/2004 | Wynne et al. | |
| 6,714,563 B1 | 3/2004 | Kushi | |
| 6,721,273 B1 | 4/2004 | Lyon | |
| 6,745,224 B1 | 6/2004 | D'Souza et al. | |
| 6,769,043 B1 | 7/2004 | Fedorkow et al. | |
| 6,804,236 B1 | 10/2004 | Mahajan et al. | |
| 6,807,158 B2 | 10/2004 | Krishnamurthy et al. | |
| 6,807,172 B1 | 10/2004 | Levenson et al. | |
| 6,829,222 B2 | 12/2004 | Amis et al. | |
| 6,870,846 B2 | 3/2005 | Cain | |
| 6,954,449 B2 | 10/2005 | Cain et al. | |
| RE38,902 E | 11/2005 | Srisuresh et al. | |
| 6,977,895 B1 | 12/2005 | Shi et al. | |
| 6,977,937 B1 | 12/2005 | Weinstein et al. | |
| 6,980,515 B1 | 12/2005 | Schunk et al. | |
| 6,980,537 B1 | 12/2005 | Liu | |
| 6,990,350 B2 | 1/2006 | Davis et al. | |
| 7,020,501 B1 | 3/2006 | Elliott et al. | |
| 7,020,701 B1 | 3/2006 | Gelvin et al. | |
| 7,039,720 B2 | 5/2006 | Alfieri et al. | |
| 7,042,834 B1 | 5/2006 | Savage | |
| 7,042,837 B1 * | 5/2006 | Cassiday et al. | 370/225 |
| 7,046,628 B2 | 5/2006 | Luhmann et al. | |
| 7,065,059 B1 | 6/2006 | Zinin | |
| 7,068,971 B2 | 6/2006 | Abutaleb et al. | |
| 7,072,952 B2 | 7/2006 | Takehiro et al. | |
| 7,106,703 B1 | 9/2006 | Belcea | |
| 7,120,120 B2 | 10/2006 | Guerin et al. | |
| 7,177,295 B1 | 2/2007 | Sholander et al. | |
| 7,184,421 B1 | 2/2007 | Liu et al. | |
| 7,200,120 B1 | 4/2007 | Greenberg et al. | |
| 7,215,926 B2 | 5/2007 | Corbett et al. | |
| 7,254,111 B2 | 8/2007 | Choe et al. | |
| 7,266,386 B2 | 9/2007 | Kim et al. | |
| 7,281,057 B2 | 10/2007 | Cain | |
| 7,353,259 B1 | 4/2008 | Bakke et al. | |
| 7,369,512 B1 | 5/2008 | Shurbanov et al. | |
| 2001/0007560 A1 | 7/2001 | Masuda et al. | |
| 2001/0034793 A1 | 10/2001 | Madruga et al. | |
| 2001/0040895 A1 | 11/2001 | Templin | |
| 2001/0045914 A1 | 11/2001 | Bunker | |
| 2002/0016869 A1 | 2/2002 | Comeau et al. | |
| 2002/0029214 A1 | 3/2002 | Yianilos et al. | |
| 2002/0057660 A1 | 5/2002 | Park et al. | |
| 2002/0067693 A1 * | 6/2002 | Kodialam et al. | 370/216 |
| 2002/0071392 A1 | 6/2002 | Grover et al. | |
| 2002/0080755 A1 | 6/2002 | Tasman et al. | |
| 2002/0103893 A1 | 8/2002 | Frelechoux et al. | |
| 2002/0108107 A1 | 8/2002 | Darnell et al. | |
| 2002/0131409 A1 | 9/2002 | Frank et al. | |
| 2002/0143755 A1 | 10/2002 | Wynblatt et al. | |
| 2002/0176390 A1 | 11/2002 | Sparr et al. | |
| 2002/0186694 A1 | 12/2002 | Mahajan et al. | |
| 2002/0191545 A1 * | 12/2002 | Pieda et al. | 370/238 |
| 2003/0012168 A1 | 1/2003 | Elson et al. | |
| 2003/0016624 A1 | 1/2003 | Bare | |
| 2003/0058852 A1 | 3/2003 | Luhmann et al. | |
| 2003/0063613 A1 * | 4/2003 | Carpini et al. | 370/401 |
| 2003/0096577 A1 | 5/2003 | Heinonen et al. | |
| 2003/0124976 A1 | 7/2003 | Tamaki et al. | |
| 2003/0126284 A1 | 7/2003 | Houston et al. | |
| 2003/0153338 A1 | 8/2003 | Herz et al. | |
| 2003/0174719 A1 | 9/2003 | Sampath et al. | |
| 2003/0202476 A1 * | 10/2003 | Billhartz et al. | 370/236 |
| 2004/0001720 A1 | 1/2004 | Krill et al. | |
| 2004/0003111 A1 | 1/2004 | Maeda et al. | |
| 2004/0027284 A1 | 2/2004 | Leeper et al. | |
| 2004/0029553 A1 | 2/2004 | Cain | |
| 2004/0106408 A1 | 6/2004 | Beasley et al. | |
| 2004/0202164 A1 | 10/2004 | Hooper et al. | |
| 2004/0213167 A1 | 10/2004 | Garcia-Luna-Aceves et al. | |
| 2004/0243702 A1 | 12/2004 | Vainio et al. | |
| 2005/0013613 A1 | 1/2005 | Stevenson et al. | |
| 2005/0030949 A1 | 2/2005 | Shirakawa et al. | |
| 2005/0036442 A1 * | 2/2005 | Saleh et al. | 370/216 |
| 2005/0050221 A1 | 3/2005 | Tasman et al. | |
| 2005/0117914 A1 | 6/2005 | Chuah et al. | |
| 2005/0213586 A1 | 9/2005 | Cyganski et al. | |
| 2007/0106852 A1 | 5/2007 | Lam et al. | |

FOREIGN PATENT DOCUMENTS

| | | |
|---|---|---|
| WO | WO-0137483 | 5/2001 |

OTHER PUBLICATIONS

U.S. Appl. No. 10/702,308, Shurbanov et al., unpublished.
Office Action dated May 16, 2007, U.S. Appl. No. 10/702,308.
Office Action dated Oct. 3, 2007, U.S. Appl. No. 10/702,308.
Office Action dated Oct. 11, 2005, U.S. Appl. No. 10/649,030.
Office Action dated Oct. 10, 2006, U.S. Appl. No. 10/649,030.
Office Action dated May 17, 2007, U.S. Appl. No. 10/649,030.
Office Action dated Nov. 2, 2007, U.S. Appl. No. 10/786,335.
Office Action dated Nov. 16, 2007, U.S. Appl. No. 10/649,030.
Office Action dated Dec. 13, 2007, U.S. Appl. No. 10/328,566.
Office Action dated Apr. 18, 2008, U.S. Appl. No. 11/088,045.
Office Action dated Jun. 11, 2008, U.S. Appl. No. 10/786,335.
Office Action dated Jun. 26, 2008, U.S. Appl. No. 10/913,151.
Basu et al., "Movement Control Algorithms for Realization of Fault-Tolerant Ad Hoc Robot Networks," IEEE Network, pp. 36-44, Jul./Aug. 2004.

Bevan et al., "Free-Space Optical Data Bus for Spacecraft", Earth Science Technology Conference, Jun. 24-26, 2003, 6 pages.

Choudhury et al., "Using Directional Antennas for Medium Access Control in Ad Hoc Networks", MOBICOM' 002, Sep. 23-28, 2002, pp. 59-70.

Everett, "GPM Reference Interfaces", May 30, 2001, 9 pages.

Garcia, Lune Aceves et al., "Analysis of Routing Strategies for Packet Radio Networks", Proc. of the IEEE INFOCOM '85, Washington, DC, 292-302 (185).

Garg, et al, "Improved Approximation Algorithms for Biconnected Subgraphs via Better Lower Bounding Techniques," Department of Computer Science and Engineering, Indian Institute of Technology, New Delhi, pp. 103-111 (1993).

Hahn et al., "Packet Radio Network Routing Algorithms: A Survey," IEEE Communications Magazine. 22:11, 41-7 (Nov. 1984).

Hsu et al., "Simpler and Faster Biconnectivity Augmentation," Journal of Algorithms, 45:55-71 (2002).

Jennings et al., "Topology Control for Efficient Information Dissemination in Ad-hoc Networks," Jet Propulsion Laboratory, pp. 1-7. (2002).

Jubin et al., "The DARPA Packet Radio Network Protocols," Proc. of the IEEE, 75:1, 21-32 (Jan. 1987).

Kahn, "The Organization of Computer Resources into a Packet Radio Network," IEEE Trans. on Communications. COM-25:1, 169-78 (Jan. 1977).

Karp, B. et al. GPSR: Greedy Perimeter Stateless Routing for Wireless Networks. ACM/IEEE International Conference on Mobile Computing and Networking (MobiCom 2000).

Khuller et al., "Biconnectivity Approximations and Graph Carvings," Journal of the ACM, 41(2):214-235 (1994).

Lauer, Gregory S., "Packet Radio Routing," Ch. 11, "Routing in Communications Networks," ed. Martha Steenstrup, Prentice Hall, pp. 352-396 (1995).

Li et al., "Sending Messages to Mobile Users in Disconnected Ad-Hoc Wireless Networks," MOBICOM (2000).

Liao et al., "GRID: A Fully Location-Aware Routing Protocol for Mobile Ad Hoc Networks," Telecommunications Systems, 18(1):37-60 (2001).

Lin et al., "Adaptive Clustering for Mobile Wireless Networks," IEEE Journal on Selected Areas In communications, 15(7):1-21 (1997).

McAuley et al., "Self-Configuring Networks," MOBICOM pp. 315-319 (2000).

Mount, "Articulation Points and Biconnected Components," CMSC 451: Lecture 11, Tuesday, Oct. 6, 1998. www.cs.umd.edu/~samir/451/bc.ps. pp. 1-5.

Moy, "Link-State Routing," Ch. 5, "Routing in Communications Networks," ed. Martha Steenstrup, Prentice Hall, pp. 136-57 (1995).

Pascall et al., "Commercial Satellite Communication", 1997 pp. 78-91.

Prague, "Power Line Carrier Techniques Applied to Spacecraft Data Handling, Data Systems In Areospace DASIA", Jun. 2-6, 2003, Czech Republic, 16 pages.

Ramanathan et al., "Topology Control of Multihop Wireless Networks using Transmit Power Adjustment," Proc. IEEE INFOCOM 2000, Mar. 2000, 10 pages.

SEA (Group) Ltd., "Terra SAR Equipment Development", 2003 1 page.

Waligore, "Test and Training Technology Workshop" Applied Research Laboratories, Feb. 15, 2002, 27 pages.

Winfield, Alan, "Distributed Sensing and Data Collection Via Broken Ad Hoc Wireless Connected Networks of Mobile Robots," Springer, pp. 273-282, (2000).

Office Action dated Jan. 22, 2009, U.S. Appl. No. 10/694,968.
Office Action dated Feb. 24, 2009, U.S. Appl. No. 10/786,335.
Office Action dated Feb. 25, 2009, U.S. Appl. No. 10/649,030.
Office Action dated Mar. 3, 2009, U.S. Appl. No. 10/752,988.
Office Action dated May 1, 2009, U.S. Appl. No. 10/913,151.
Office Action dated Oct. 27, 2009, U.S. Appl. No. 10/786,335.
Office Action dated Nov. 2, 2009, U.S. Appl. No. 10/752,988.
Office Action dated Nov. 24, 2009, U.S. Appl. No. 10/913,151.

* cited by examiner

SYSTEMS AND METHODS FOR FORWARDING DATA IN A COMMUNICATIONS NETWORK

FIELD OF THE INVENTION

The present invention relates generally to communications networks and, more particularly, to systems and methods for forwarding data in communications networks.

BACKGROUND OF THE INVENTION

Communications networks have existed for decades. To route datagrams, such as packets, cells, etc., through such networks, each routing node in the networks may rely on forwarding tables. Forwarding tables provide routing nodes with instructions for forwarding a received datagram "one hop" further towards its destination. Specifically, a routing node can inspect one or more fields in a datagram, look up a corresponding entry in a forwarding table, and then put the datagram on the indicated queue for outbound transmission across one of a group of outbound links associated with the routing node.

Many variants exist on how to build and use forwarding tables. Many existing routing nodes, for instance, create multiple forwarding tables. Then, when a datagram arrives, the routing node selects which forwarding table should be used for this particular datagram. The choice of forwarding table typically depends on the protocol used by the datagram, the datagram's relative priority, or the like.

When failures occur in the network (e.g., a link fails), the routing nodes may often need to be supplied with (or need to generate) new forwarding tables to allow the nodes to route datagrams around the failures, which can cause delays in the network. Therefore, there exists a need to improve data routing in communications networks.

SUMMARY OF THE INVENTION

Systems and methods consistent with the principles of the invention provide improved techniques for routing data in a communications network.

In accordance with an exemplary implementation consistent with the principles of the invention, a communications network includes at least one control station and a group of network nodes. The at least one control station generates batches of forwarding tables, where each batch of forwarding tables includes a primary forwarding table and a group of backup forwarding tables, and forwards the batches of forwarding tables. Each of the network nodes is associated with one or more outbound and inbound links and is configured to receive a batch of forwarding tables from the at least one control station and install the primary forwarding table from the batch as a current forwarding table. Each network node is further configured to detect that a quality of one of an outbound and inbound link has changed, generate a message instructing other nodes of the group of network nodes to switch to a backup forwarding table in response to detecting the quality change, and transmit the message to the other nodes.

In another implementation consistent with the principles of the invention, a control station in a communications network that includes a group of nodes, includes a processor and a memory configured to store topology information for the communications network. The processor is configured to generate a batch of forwarding tables for each of the group of nodes based on the topology information, where each batch of forwarding tables includes a primary forwarding table and a group of backup forwarding tables, and cause each batch of forwarding tables to be transmitted to the corresponding node of the group of nodes.

In yet another implementation consistent with the principles of the invention, a method for routing data in a communications network is provided. The method includes receiving a group of forwarding tables, including a primary forwarding table and a group of backup forwarding tables, from a remote device; using the primary forwarding table as a current forwarding table for routing data in the communications network; and storing the group of backup forwarding tables. The group of backup forwarding tables enables continued routing of data in the communications network when at least one event occurs in the communications network.

In still another implementation consistent with the principles of the invention, a node, associated with at least one outbound link and at least one inbound link, that transmits data in the communications network is provided. The node includes a processor and a memory configured to store a primary forwarding table and a group of backup forwarding tables. The processor detects a change in quality in one of the at least one outbound link and the at least one inbound link, generates a message that identifies the detected one outbound link or inbound link, and causes the message to be transmitted to one or more other nodes in the communications network. The message instructs the one or more other nodes to switch to a backup forwarding table associated with the identified one outbound link or inbound link.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the principles of the invention ensure continued operation of a communications network when one or more events (e.g., link failure or degradation) occur in the communications network. To ensure the continued operation of the network, each node in the network stores a group of backup forwarding tables. When an event occurs, the nodes may switch to one of the backup forwarding tables and continue to route data based on the backup forwarding table.

Exemplary Network

Figure 1:
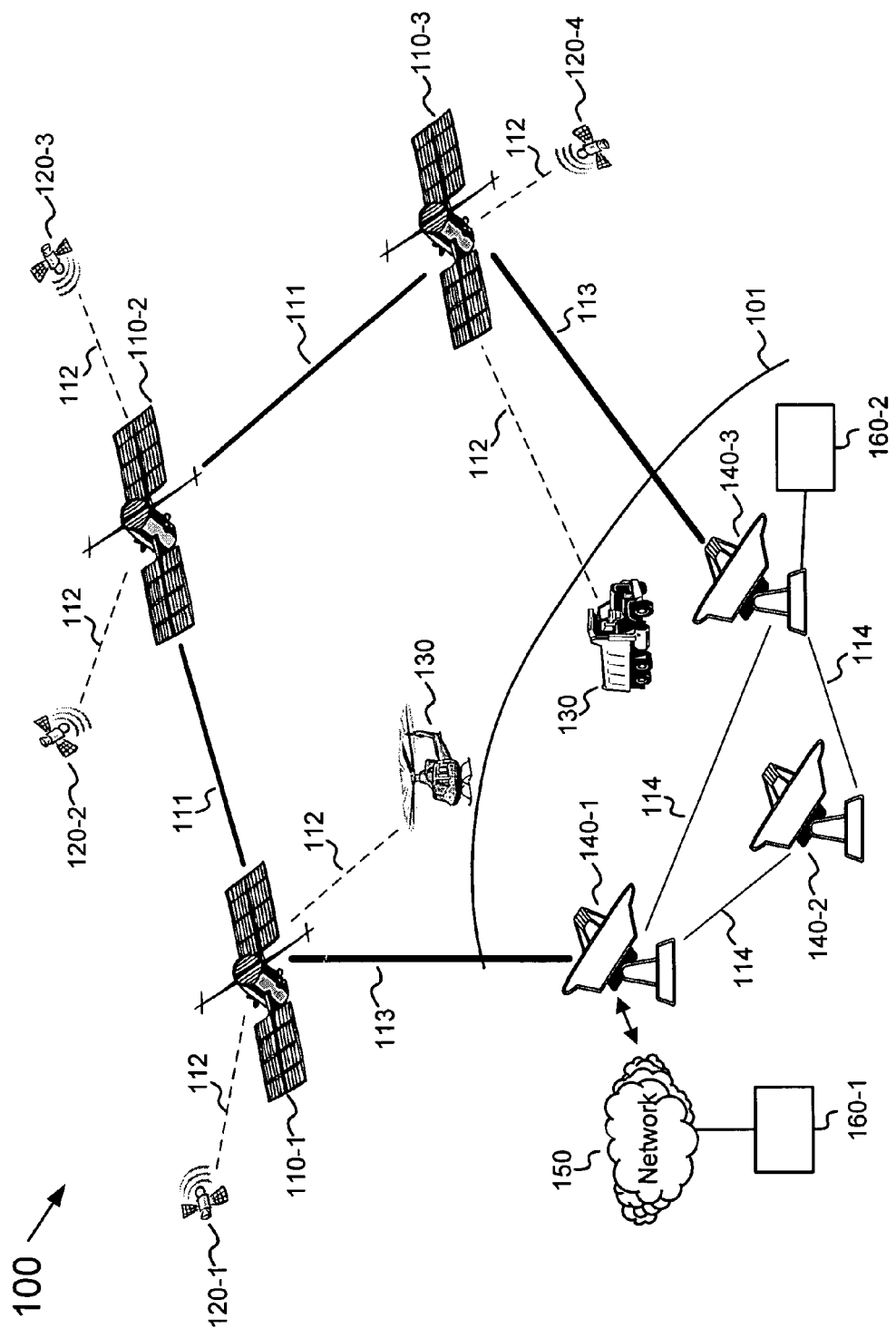
FIG. 1 illustrates an exemplary communications network in which systems and methods consistent with the principles of the invention may be implemented.

FIG. 1 illustrates an exemplary communications network 100 in which systems and methods consistent with the principles of the invention may be implemented. In FIG. 1, curved line 101 represents the edge of the Earth. Network 100 may include a number of elements that correspond to either Earth-based or space-based network devices.

As shown in FIG. 1, the space-based network devices may include a number of "backbone" satellites 110-1, 110-2, and 110-3 (collectively backbone satellites 110), and a number of "user" satellites 120-1 through 120-4 (collectively user satellites 120) that communicate through backbone satellites 110 to obtain network service. Although three backbone satellites 110 and four user satellites 120 are shown in FIG. 1, one of ordinary skill in the art will recognize that these numbers are for illustrative purposes only.

Backbone satellites 110 communicate with each other over inter-satellite links, labeled as links 111 in FIG. 1. These links may be implemented as optical (e.g., laser) communication links or as conventional radio frequency (RF) links (e.g., microwave). In either case, backbone satellites 110 may use directional transmitters and receivers to communicate with one another. Directional transmitters and receivers allow backbone satellites 110 to communicate over longer distances than with omni-directional communication schemes. Directional communication schemes, however, require that each backbone satellite 110 know its location relative to another backbone satellite with which it would like to communicate so that it can point its transmitter/receiver in the correct direction.

Inter-satellite links 111 may be high capacity links. For example, when implemented using RF technology, they may run at 100 s of megabits/second. When implemented with optical transmitters and receivers, they may run at 10 s of gigabits/second.

User satellites 120 may communicate with backbone satellites 110 through access links 112 (shown in FIG. 1 as dotted lines). Access links 112 may be RF links than tend to be of lower capacity and have shorter ranges than inter-satellite links 111. Access links 112 may also be designed to only require omni-directional antennas on user satellites 120. Omni-directional antennas do not require the sophisticated pointing and tracking mechanisms that are required of directional antennas. Backbone satellites 110, in forming access links 112, may use, for example, omni-directional, patch, sectorized, or dish antennas. The particular antenna to use may depend on the specific services that are required. The RF communications forming access links 112 may be in a number of frequency bands, such as UHF band, L band, cellular (or GSM or PCS) bands, ISM bands (910 MHz or 2.4 GHz), or other convenient frequency bands.

Network 100, in addition to including backbone satellites 110 and user satellites 120, may also include earth-based entities 130. As shown in FIG. 1, earth-based entities 130 (illustratively shown as a helicopter and a truck) may interface with network 100 through access links 112 in a manner similar to user satellites 120.

Backbone satellites 110 may connect to one or more ground stations 140-1 through 140-3 (collectively ground stations 140) via up/down links 113. Up/down links 113 may include high capacity links designed for communication between a satellite and a ground terminal. Ground stations 140 may include fairly large and established ground terminals that have high capacity links designed for communications with satellites. Ground stations 140 may include, for example, large dish antennas that communicate through an RF connection with backbone satellites 110. The RF connection may run at, for example, 1 gigabit/second.

Ground stations 140 may connect to one another through standard terrestrial links, such as fiber optic links 114. One of ordinary skill in the art will appreciate that other types of terrestrial links, such as, for instance, coaxial cable and freespace optical connections are also possible.

Ground stations 140 may also act as network gateways to other private or public networks, such as network 150. In the case of a public network, network 150 may be the Internet. In the case of a private network, network 150 may be, for example, a proprietary military or corporate network. In some cases, network 150 may include a private portion and a public portion. In general, networks 100 and 150 allow any entity that can connect to network 150 the ability to communicate through the satellite portion of network 100.

Control stations 160-1 and 160-2 (collectively control stations 160) store network topology information (and other information) for controlling the forwarding of information throughout network 100. While two standalone control stations 160 are illustrated in FIG. 1, one skilled in the art will appreciate that a typical network may include more or fewer control stations. Moreover, a control station 160 may be implemented in one or more of the other devices illustrated in FIG. 1. For example, in one implementation, a control station 160 may be implemented in a backbone satellite 110. In exemplary implementations consistent with the principles of the invention, one control station 160 acts as a primary station, while the other control stations 160 may act as backup stations, thereby providing system redundancy and robustness. All control stations 160 may store the same set of location information and satellite descriptions, execute the same algorithms, and hence, all should derive the same topology information. However, only the primary station 160 may disseminate new topology commands to background satellites 110 and ground stations 140.

Network 100 may transmit data using a packet-based transmission protocol, such as the well known Internet Protocol (IP). Under the IP protocol, each device in network 100 is associated with an IP address that uniquely identifies it from all other devices. Data sent under the IP protocol is broken into data units called packets, each of which includes the IP address that identifies the destination for the packet. A packet "hops" from one device to another in network 100 until it is received by its destination device.

Satellite Architecture

Figure 2:
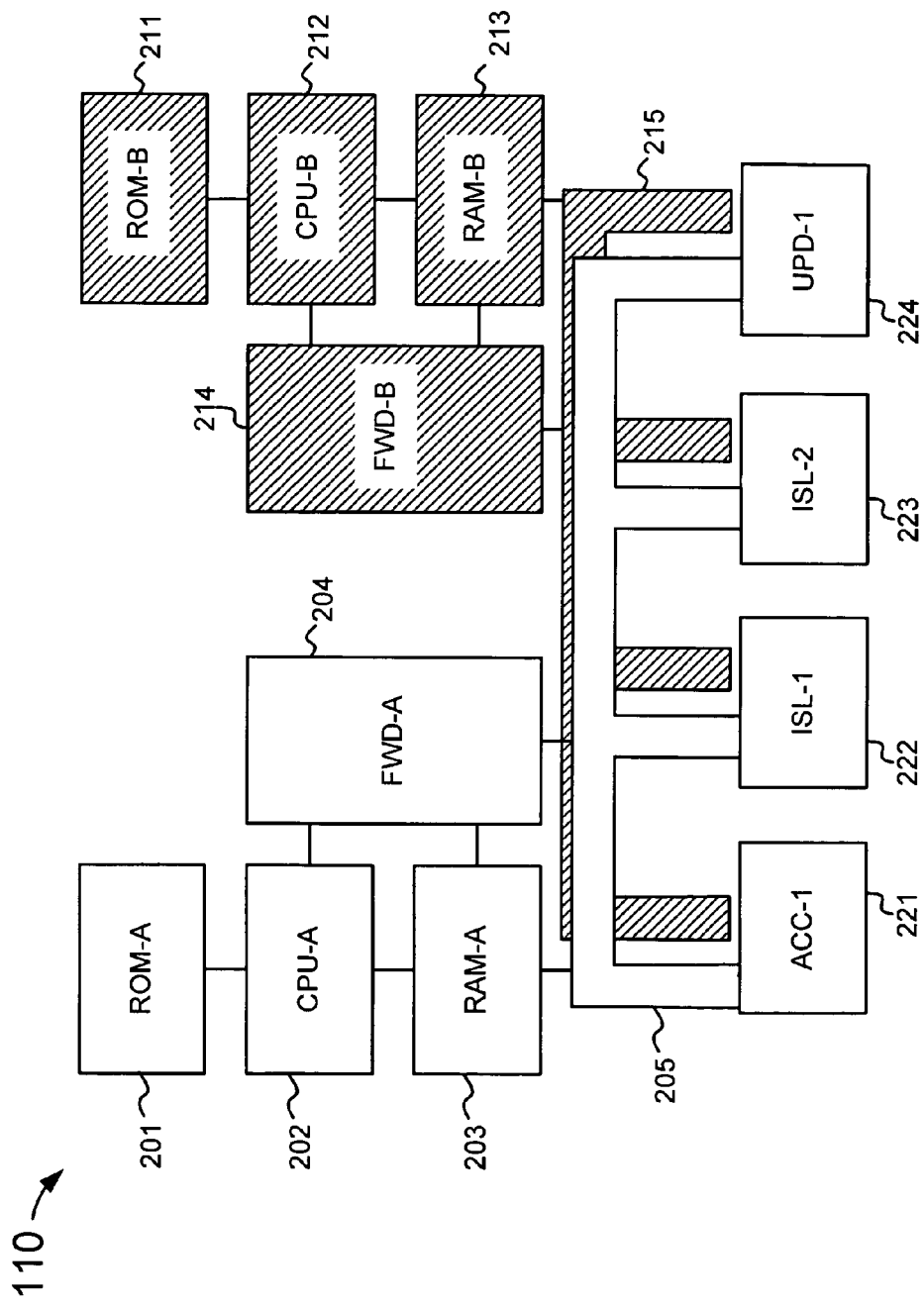
FIG. 2 illustrates an exemplary hardware diagram of one of the backbone satellites of FIG. 1.

FIG. 2 illustrates an exemplary hardware diagram of one of backbone satellites 110 of FIG. 1. Backbone satellite 110, as well as being a communication satellite, may act as a router in network 100. Backbone satellite 110 may include a redundant implementation to facilitate fault tolerance. In FIG. 2, this is shown as an "A" side architecture and a "B" side architecture.

The A side architecture may include a read-only-memory (ROM) 201, a processor (CPU) 202, random access memory (RAM) 203, and forwarding engine (FWD) 204. A cross-bar bus (X-BAR) 205 may connect RAM 203 and forwarding engine 204 to input/output components 221-224.

The B side architecture may be implemented in an essentially identical manner to the A side architecture and acts as a backup in case of a failure in the A side architecture. In particular, the B side architecture may include ROM 211, a CPU 212, RAM 213, and forwarding engine 214, which utilizes cross-bar 215.

ROM 201 and 211 may each contain all necessary read-only storage for backbone satellite 110. ROM 201 and 211 may, for example, store programming instructions for operation of the backbone satellite, geo-locations of some or all ground stations, system identifiers, configuration parameters, etc. Although shown as single monolithic ROM devices, ROM 201 and 211 may be implemented as a mix of different types of non-volatile memory, and may even include a certain amount of reprogrammable memory as well. For instance, ROM 201 or 211 may be implemented as ROM, EEPROM, flash memory, etc.

CPUs 202 and 212 may be embedded processors that execute computer instructions. CPUs 202 and 212 may generally manage the control and routing functions for backbone satellite 110.

Forwarding engines 204 and 214 may each include high-speed data forwarding paths that obtain header information from packets received by backbone satellite 110, and based on the header information, may retransmit the packets on a link that leads towards the final destination of the packet. To increase processing speed, forwarding engines 204 and 214 may be implemented as FPGAs (field programmable gate arrays), ASICs (application specific integrated circuits), or other high-speed circuitry. In general, forwarding engines 204 and 214 implement many of the core routing functions of backbone satellite 110, and thus, in conjunction with their CPUs and RAMs, function as routers in the satellite. The design and implementation of routers and routing techniques is generally known in the art and will thus not be described further herein.

Forwarding engines 204 and 214 may include one or more forwarding tables that store information relating to packet forwarding. The forwarding tables may alternatively be stored in RAM 203 and 213. In one implementation, forwarding engines 204 and 214 store a "batch" of forwarding tables. This batch contains a whole set of fallback (or backup) forwarding tables for any unexpected event or sequence of events that can occur in network 100 (e.g., a link failing). Forwarding engines 204 and 214 may store forwarding tables based on the protocol used by backbone satellite 110. For example, forwarding engines 204 and 214 may use forwarding tables for IP, asynchronous transfer mode (ATM), Multi-Protocol Label Switching (MPLS), fast packet switching, Ethernet, and the like for routing data in network 100.

Figure 3:
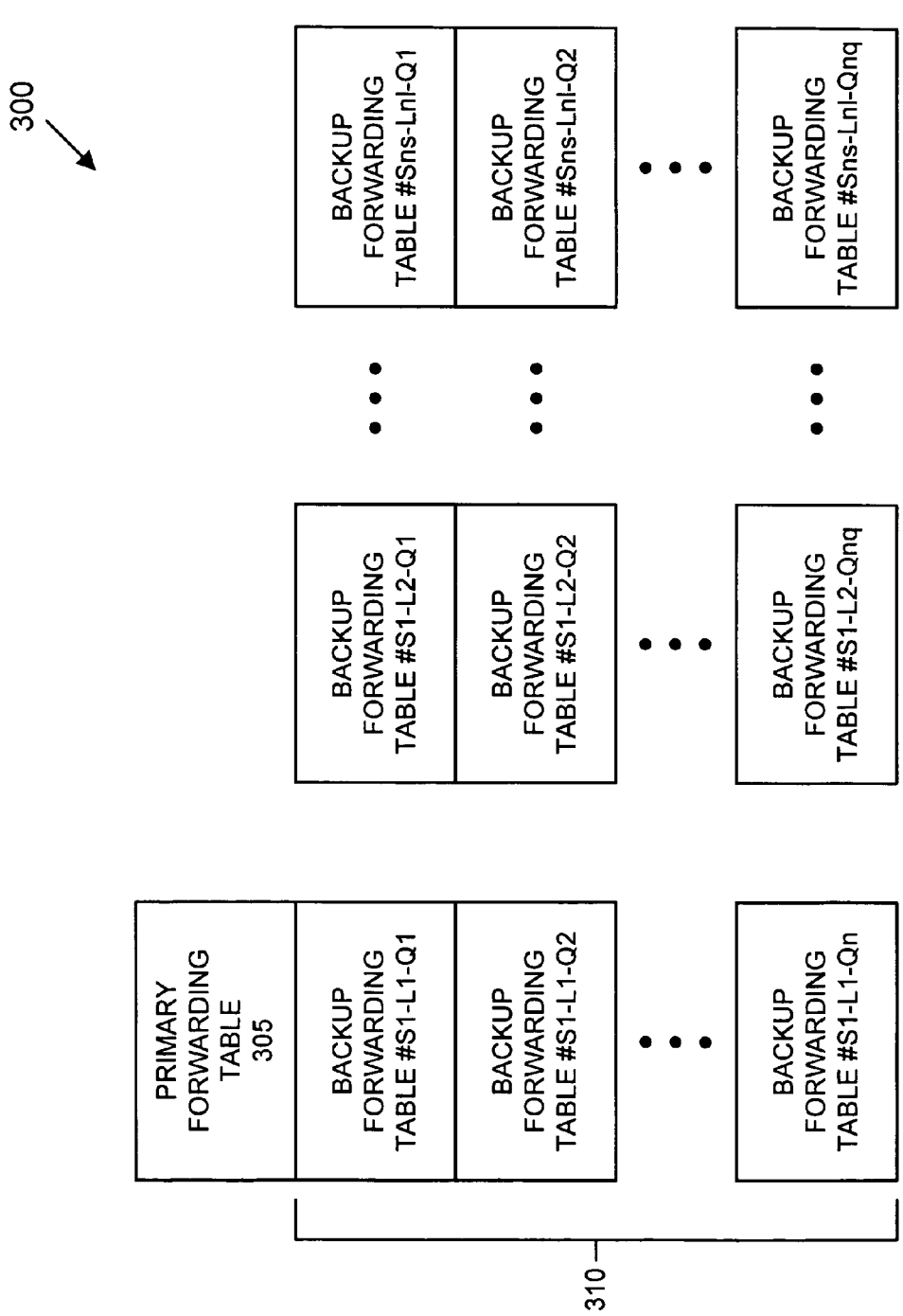
FIG. 3 illustrates an exemplary configuration of a batch of forwarding tables, in an implementation consistent with the principles of the invention, that may be relied upon by a forwarding engine in routing information in the network of FIG. 1.

FIG. 3 illustrates an exemplary batch 300 of forwarding tables, in an implementation consistent with the principles of the invention, that may be relied upon by forwarding engine 204/214 in routing information in network 100. It will be appreciated that each node (e.g., backbone satellites 110, user satellites 120, ground stations 140, etc.) in network 100 may store a similar batch 300 of forwarding tables that enables that particular node to continue to route data when unexpected events occur in network 100.

As illustrated, batch 300 may include a primary forwarding table 305 and a group of backup forwarding tables 310. Forwarding engine 204/214 may rely on primary forwarding table 305 when no problems exist in network 100 (i.e., no unexpected events have occurred). Forwarding engines 204 and 214 may also store one or more backup forwarding tables 310, which may be used by forwarding engine 204/214 when one or more unexpected events occur in network 100. In one implementation consistent with the principles of the invention, the number of backup forwarding tables 310 for a given node may be ns×nl×nq, where ns represents the total number of nodes in network 100, nl represents the total number of outbound links (e.g., transmitters) associated with a given node, and nq represents the total number of different non-normative "qualities" that a given outbound link can take.

As an example, assume that network 100 includes 10 satellites 110/120 and 2 ground stations 140. In this situation, ns would equal 12. Moreover, assume, for example, that backbone satellite 110-2 (FIG. 1) has 4 laser transmitters and 1 up/down link. For this satellite 110-2, nl would equal 5. It will be appreciated that value nl may vary for other nodes in network 100 (i.e., the other nodes may include more or fewer transmitters and/or links). If an outbound link for satellite 110-2 can run in any of three different modes (e.g., normal, degraded, failed), then nq would equal 2 for that given link since two non-normative states exist for that link (i.e., degraded or failed). Based on the above exemplary numbers, satellite 110-2 would then store a batch 300 of $$1+(12\times5\times2)=121$$

different forwarding tables—one primary forwarding table 305 and 120 backup forwarding tables 310.

Batch 300 may thus contain backup forwarding tables 310 for each possible single unexpected event that may occur in network 100. If all links are operating normally, then forwarding engine 204/214 may use primary forwarding table 305. If, for example, link 2 (L2) on a satellite S1, which could correspond to backbone satellite 110-1, unexpectedly goes into a degraded or failed mode, designated as Q2, then forwarding engine 204/214 may use the backup forwarding table #S1-L2-Q2 instead of primary forwarding table 305.

As indicated above, each node in network 100 would contain its own unique batch 300 of forwarding tables. Thus, in a network containing 12 nodes, as per the example above, there would be 12 distinct batches 300 of forwarding tables, one for each node in the network.

While the above example described the situation in which a node in network 100 includes backup forwarding tables 310 to ensure continued traffic routing when any single event occurs in network 100, implementations consistent with the present invention are not so limited. For example, in another implementation, each node in network 100 may include backup forwarding tables 310 for handling only a subset of all events that could occur in network 100 (e.g., the most probable single event failures). Alternatively, batch 300 could include enough backup forwarding tables 310 to handle any two-event scenario. In such situations, each node may include enough backup forwarding tables 310 to ensure continued operation when any two links in network 100 experience unexpected events (e.g., degraded modes, failure, etc.). In yet other implementations, each node in network 100 may contain enough backup forwarding tables 310 to handle any possible combination of unexpected events.

Returning to FIG. 2, RAM 203 and 213 include volatile memory in which data packets and/or other data structures may be stored and manipulated. I/O devices 221-224 may access RAM 203 and 213. RAM 203 and 213 may store queues of packets that can be read and transmitted by I/O devices 221-224.

I/O devices 221-224 contain the hardware interfaces, transceivers, and antennas (or telescopes) that implement links 111-113. ACC I/O device 211 handles access links 112. ISL I/O devices 222 and 223 handle inter-satellite links 111. UPD I/O device 224 handles up/down links 113.

Although backbone satellite 110 is shown as having four I/O devices 221-224, one of ordinary skill in the art will recognize that backbone satellite 110 could have more or fewer I/O devices. Further, multiple I/O devices, such as ISL I/O devices 222 and 223, may be operated in unison to form a single high capacity link.

Ground Station Architecture

Figure 4:
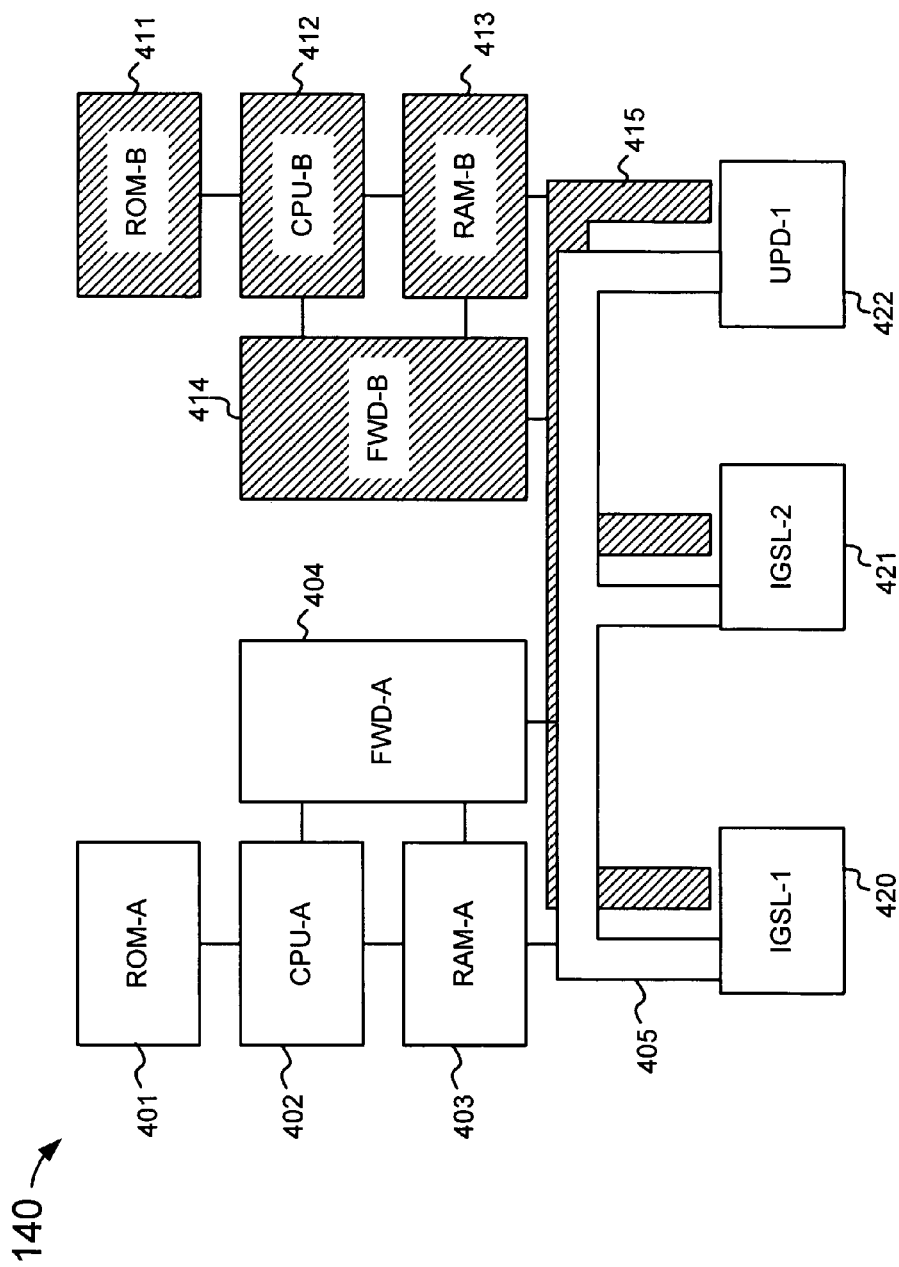
FIG. 4 illustrates an exemplary configuration of the ground station of FIG. 1 in an implementation consistent with the principles of the invention.

FIG. 4 illustrates an exemplary configuration of ground station 140 of FIG. 1 in an implementation consistent with the principles of the invention. It will be appreciated that the configuration illustrated in FIG. 4 is provided for explanatory purposes only and that many other configurations are possible.

As illustrated, ground station 140 may include a redundant implementation to facilitate fault tolerance. In FIG. 4, this is shown as an "A" side architecture and a "B" side architecture.

The A side architecture may include ROM 401, a processor (CPU) 402, RAM 403, and forwarding engine (FWD) 404. A cross-bar bus (X-BAR) 405 may connect RAM 403 and forwarding engine 404 to input/output components 420-422.

The B side architecture may be implemented in an essentially identical manner to the A side architecture and acts as a backup in case of a failure in the A side architecture. In particular, the B side architecture may include ROM 411, a CPU 412, RAM 413, and forwarding engine 414, which utilizes cross-bar 415.

ROM 401 and 411 may each contain all necessary read-only storage for ground station 140. ROM 401 and 411 may, for example, store programming instructions for operation of the ground station, geo-locations of some or all backbone satellites 110, system identifiers, configuration parameters, etc. Although shown as single monolithic ROM devices, ROM 401 and 411 may be implemented as a mix of different types of non-volatile memory, and may even include a certain amount of reprogrammable memory as well. For instance, ROM 401 or 411 may be implemented as ROM, EEPROM, flash memory, etc.

CPUs 402 and 412 may be embedded processors that execute computer instructions. CPUs 402 and 412 may generally manage the control and routing functions for ground station 140.

Forwarding engines 404 and 414 may each include high-speed data forwarding paths that obtain header information from packets received by ground station 140, and based on the header information, may retransmit the packets on a link that leads towards the final destination of the packet. To increase processing speed, forwarding engines 404 and 414 may be implemented as FPGAs, ASICs, or other high-speed circuitry. In general, forwarding engines 404 and 414 implement many of the core routing functions of ground station 140, and thus, in conjunction with their CPUs and RAMs, function as routers in the ground station. The design and implementation of routers and routing techniques is generally known in the art and will thus not be described further herein.

Forwarding engines 404 and 414 may include one or more forwarding tables that store information relating to packet forwarding. The forwarding tables may alternatively be stored in RAM 403 and 413. In one implementation, forwarding engines 404 and 414 store a unique batch 300 of forwarding tables 305 and 310 in a manner similar to that described above with respect to FIG. 3.

RAM 403 and 413 include volatile memory in which data packets and/or other data structures may be stored and manipulated. I/O devices 420-422 may access RAM 403 and 413. RAM 403 and 413 may store queues of packets that can be read and transmitted by I/O devices 420-422.

I/O devices 420-422 contain the hardware interfaces, transceivers, and antennas (or telescopes) that implement links 113 and 114. Inter-ground station links (IGSL) I/O devices 420 and 421 handle links 114. UPD I/O device 422 handles up/down links 113.

Although ground station 140 is shown as having three I/O devices 420-422, one of ordinary skill in the art will recognize that ground station 140 could have more or fewer I/O devices. Further, multiple I/O devices, such as IGSL I/O devices 420 and 421, may be operated in unison to form a single high capacity link.

Control Station Architecture

Figure 5:
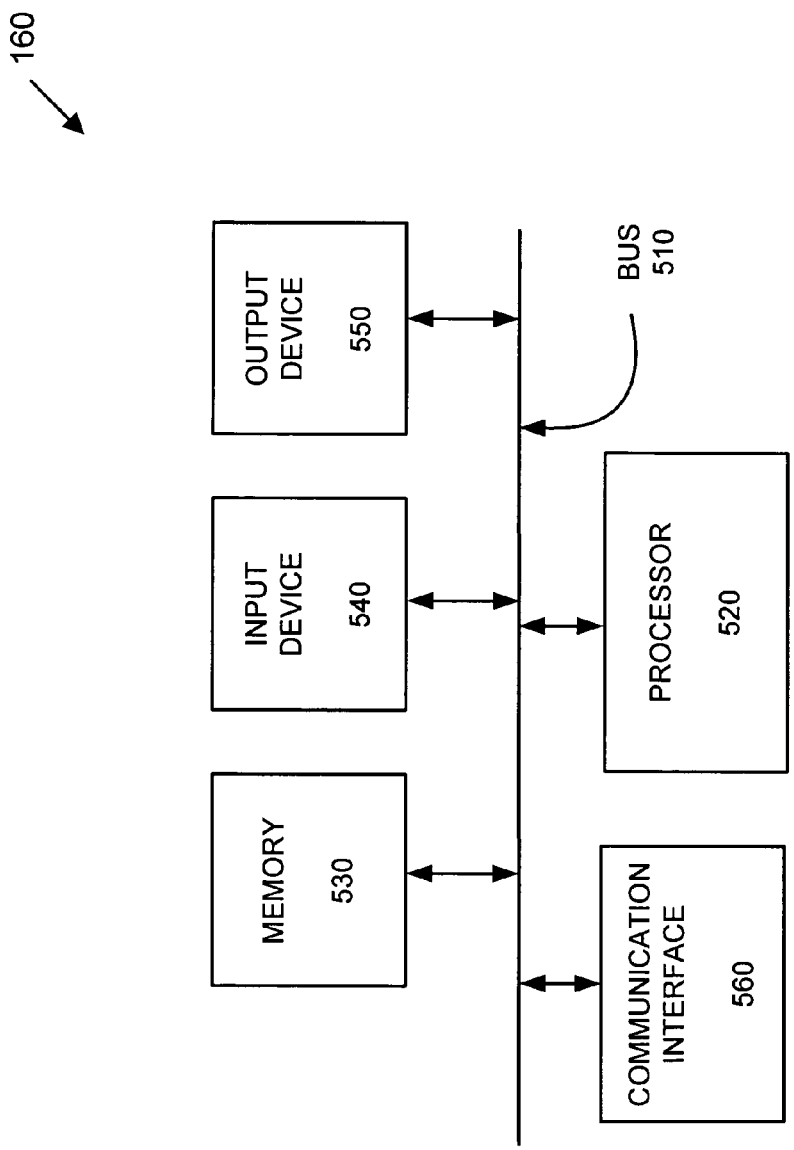
FIG. 5 illustrates an exemplary configuration of the control station of FIG. 1 in an implementation consistent with the principles of the invention.

FIG. 5 illustrates an exemplary configuration of one of control stations 160 of FIG. 1 in an implementation consistent with the principles of the invention. It will be appreciated that the configuration illustrated in FIG. 5 is provided for explanatory purposes only and that many other configurations are possible. Moreover, it will be appreciated that a typical control station 160 may include other components than those illustrated in FIG. 5 that aid in receiving, processing, and/or transmitting data.

As illustrated, control station 160 may include a bus 510, a processor 520, a memory 530, an input device 540, an output device 550, and a communication interface 560. Bus 510 permits communication among the components of control station 160.

Processor 520 may include any type of conventional processor or microprocessor that interprets and executes instructions. Memory 530 may include a RAM or another type of dynamic storage device that stores information and instructions for execution by processor 520, a ROM device and/or another type of static storage device that stores static information and instructions for processor 520, and/or a magnetic disk or optical disk and its corresponding drive.

Input device 540 may include one or more conventional mechanisms that permit an operator to input information to control station 160, such as a keyboard, pointing device (e.g., a mouse, a pen, or the like), one or more biometric mechanisms, such as a voice recognition device, etc. Output device 550 may include one or more conventional mechanisms that output information to the operator, such as a display, a printer, a speaker, etc. Communication interface 560 may include any transceiver-like mechanism that enables control station 160 to communicate with other devices and/or systems. For example, communication interface 560 may include a modem or an Ethernet interface to a network. Alternatively, communication interface 560 may include other mechanisms for communicating via a data network, such as network 150.

Control station 160 may implement the functions described below in response to processor 520 executing software instructions contained in a computer-readable medium, such as memory 530. A computer-readable medium may be defined as one or more memory devices. In alternative embodiments, hardwired circuitry may be used in place of or in combination with software instructions to implement features consistent with the principles of the invention. Thus, implementations consistent with the principles of the invention are not limited to any specific combination of hardware circuitry and software.

Exemplary Processing

Figure 6:
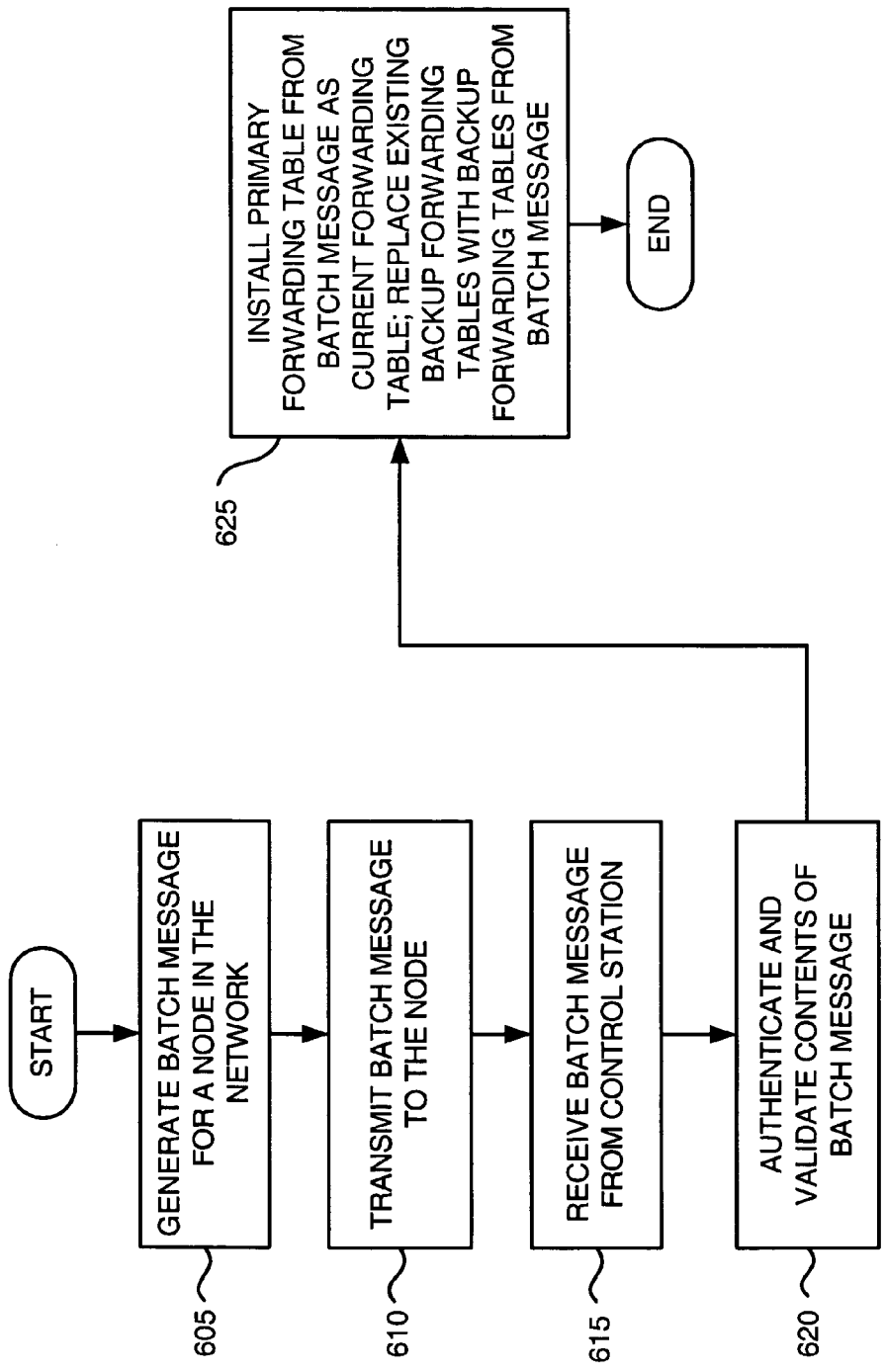
FIG. 6 illustrates an exemplary process for transmitting and processing batch messages in an implementation consistent with the principles of the invention.

FIG. 6 illustrates an exemplary process for transmitting and processing batch messages in an implementation consistent with the principles of the invention. In general, batch messages are used to forward primary forwarding tables and backup forwarding tables to nodes in network 100. Processing may begin with a control station, such as control station 160 (FIG. 1), generating a batch message for a node, such as a backbone satellite 110 or ground station 140, in network 100 (act 605). As set forth above, control station 160 may store the topology of the entire network 100 and may generate the batch message based on the network topology. Control station 160 may generate the batch message when network topology is going to change or any other time at which new forwarding tables are needed for network 100 (e.g., after central station 160 determines that an unexpected event has occurred, when a new node is added to network 100, etc.).

The batch message may include a primary forwarding table 305 and a group of backup forwarding tables 310. As described above, the number of backup forwarding tables 310 may be enough to handle any single unexpected event, a subgroup of possible unexpected events, or any combination of two or more unexpected events.

Figure 7:
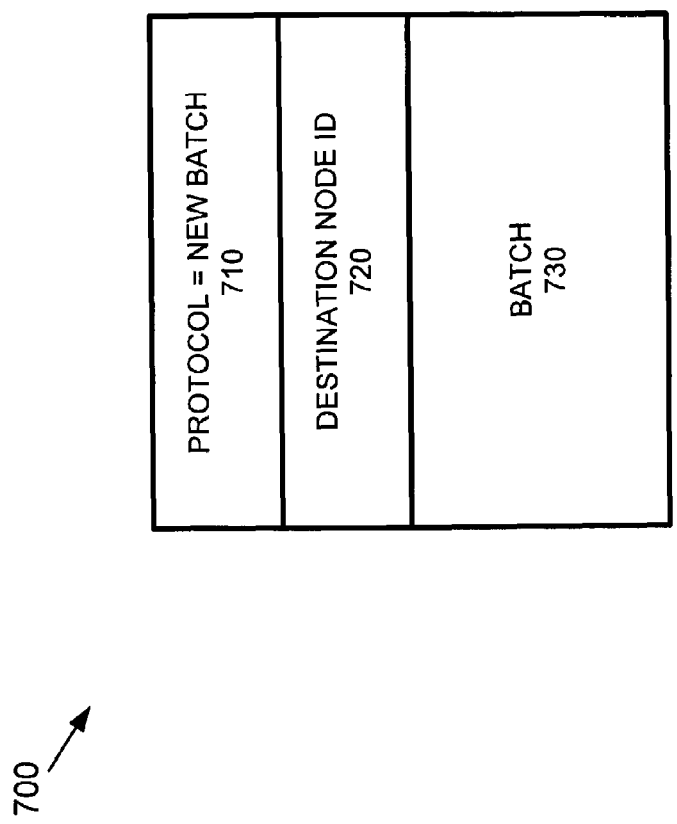
FIG. 7 illustrates an exemplary configuration of a batch message in an implementation consistent with the principles of the invention.

FIG. 7 illustrates an exemplary configuration of a batch message 700 in an implementation consistent with the principles of the invention. As illustrated, batch message 700 may include a protocol field 710, a destination node identifier (ID) field 720, and a batch field 730. It will be appreciated that batch message 700 may include other fields than those illustrated in FIG. 7. For example, batch message 700 may include a field identifying the control station from which batch message 700 is transmitted.

Protocol field 710 may include information identifying message 700. In one implementation, protocol field 710 may store information indicating that message 700 is a new batch message 710. Destination node ID field 720 may store information identifying the particular node to which batch message 700 is destined. Batch field 730 may store batch 300 of forwarding tables for the node identified in destination node ID field 720.

Once generated, control station 160 may transmit batch message 700 to the destination node (act 610). Control station 160 may generate and transmit batch messages 700 in the above-described manner for all of the nodes in network 100. Control station 160 may implement the following acts, expressed as a high-level pseudo-code, to ensure that the requisite number of forwarding tables (primary 305 and backup 310) are generated for each node in network 100:

```
For I = 1 to ns
    Compute Primary Forwarding Table for node I
    For J = 1 to ns
        For K = 1 to nl
            For L = 1 to nq
                Compute Backup Forwarding Table #J-K-L for node
                    ns, and add to batch
            Next L
        Next K
    Next J
    Store batch in batch message
    Disseminate batch to node I
Next I.
```

The network node may receive batch message 700 from control station 160 (act 615). In response, the network node may authenticate and validate the contents of batch message 700 (act 620). To authenticate and validate batch message 700, the network node may, for example, check destination node field 720 to ensure that batch message 700 is intended for this particular network node. The network node may also check that batch message 700 includes the correct number of primary and backup forwarding tables.

The network node may install primary forwarding table 305 from batch message 700 as the current forwarding table (act 625). Network node may also replace any existing backup forwarding tables with backup forwarding tables 310 from batch message 700 (act 625).

If a given network node detects a local failure, the network node may generate a command telling other network nodes to switch to the appropriate backup forwarding table 310 instead of primary forwarding table 305. In general, the network node may detect a local failure in a number of different ways (e.g., the network node's transmitter equipment may be able to generate a signal that it has failed, a "loss of carrier" indication may be associated with the link, "hello packets" may cease flowing, etc.). Any of these techniques may be used to deduce that an outbound link has failed, and to trigger the transmission of a switch message.

Figure 8:
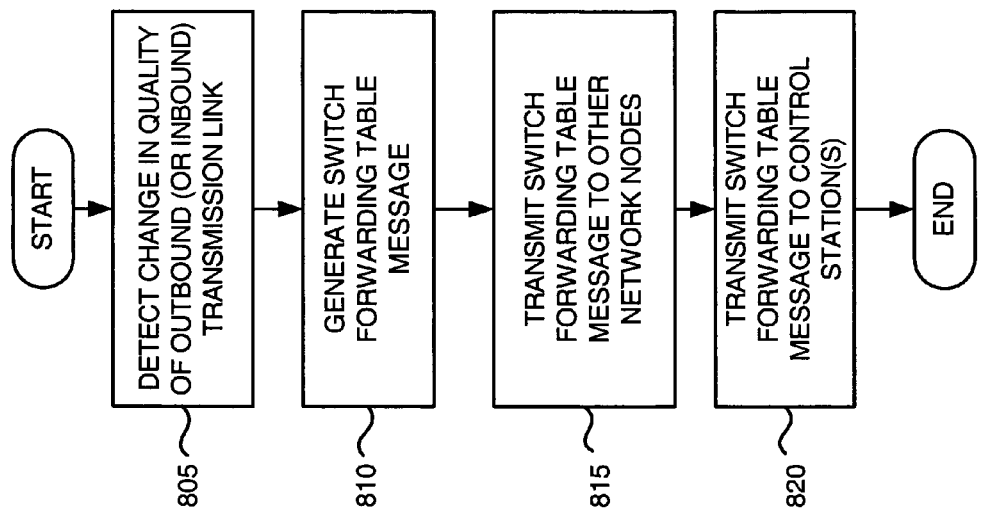
FIG. 8 illustrates an exemplary process, performed by a network node, when a failure is detected by the network node in an implementation consistent with the principles of the invention.

FIG. 8 illustrates an exemplary process, performed by a network node (e.g., a backbone satellite 110, a ground station 140, etc.), when a failure is detected by the network node. It is assumed, for explanatory purposes, that the network node is node #I. Processing may begin with the network node detecting a quality degradation (failure, degraded mode, etc.) of an outbound (or inbound) transmission link #K, associated with the network node (act 805). The quality of this link as a result of the failure (or quality degradation) will be denoted as #L. The network node may generate a switch forwarding table message to indicate to other nodes in network 100 that they are to switch to backup forwarding table #I-K-L (act 810). The remainder of FIG. 8 is discussed below.

Figure 9:
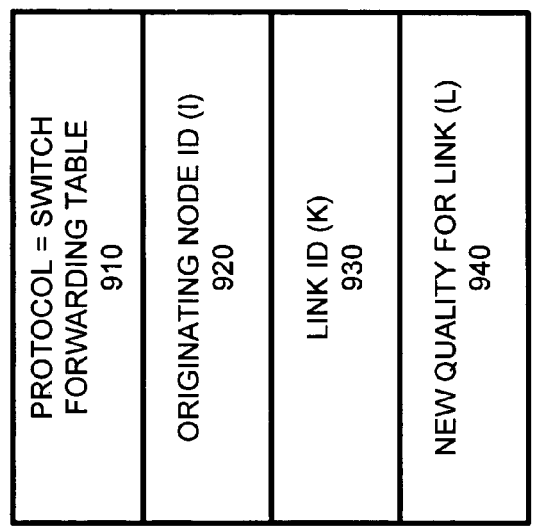
FIG. 9 illustrates an exemplary configuration of a switch forwarding table message in an implementation consistent with the principles of the invention.

FIG. 9 illustrates an exemplary configuration of a switch forwarding table message 900 in an implementation consistent with the principles of the invention. As illustrated, switch forwarding table message 900 may include a protocol field 910, an originating node ID field 920, a link ID field 930, and a new quality for link field 940. It will be appreciated that switching forwarding table message 900 may include other fields than those illustrated in FIG. 9. For example, switch forwarding table message 900 may include a field identifying whether the link in link ID field 930 is an outbound or inbound link.

Protocol field 910 may include information identifying message 900. In one implementation, protocol field 910 may store information indicating that message 900 is a message instructing other network nodes to switch forwarding tables. Originating node ID field 920 may store information identifying the particular node from which switch forwarding table message 900 originated. In the example above, originating node ID field 920 may store information identifying the network node as node #I. Link ID field 930 may store information identifying the link associated with the network node identified in originating node ID field 920 that has experienced the event (e.g., failure, degradation, etc.). In the example above, link ID field 930 may store information identifying the link as #K. New quality for link field 940 may store information identifying the quality of the link identified in link ID field 930. In the example above, new quality for link field 940 may store information identifying the quality as #L.

Once switch forwarding table message 900 is generated, the network node may transmit switch forwarding table message 900 to the other network nodes in network 100 (act 815). The network node may also transmit switch forwarding message 900 to all control stations 160 in network 100 (act 820).

Figure 10:
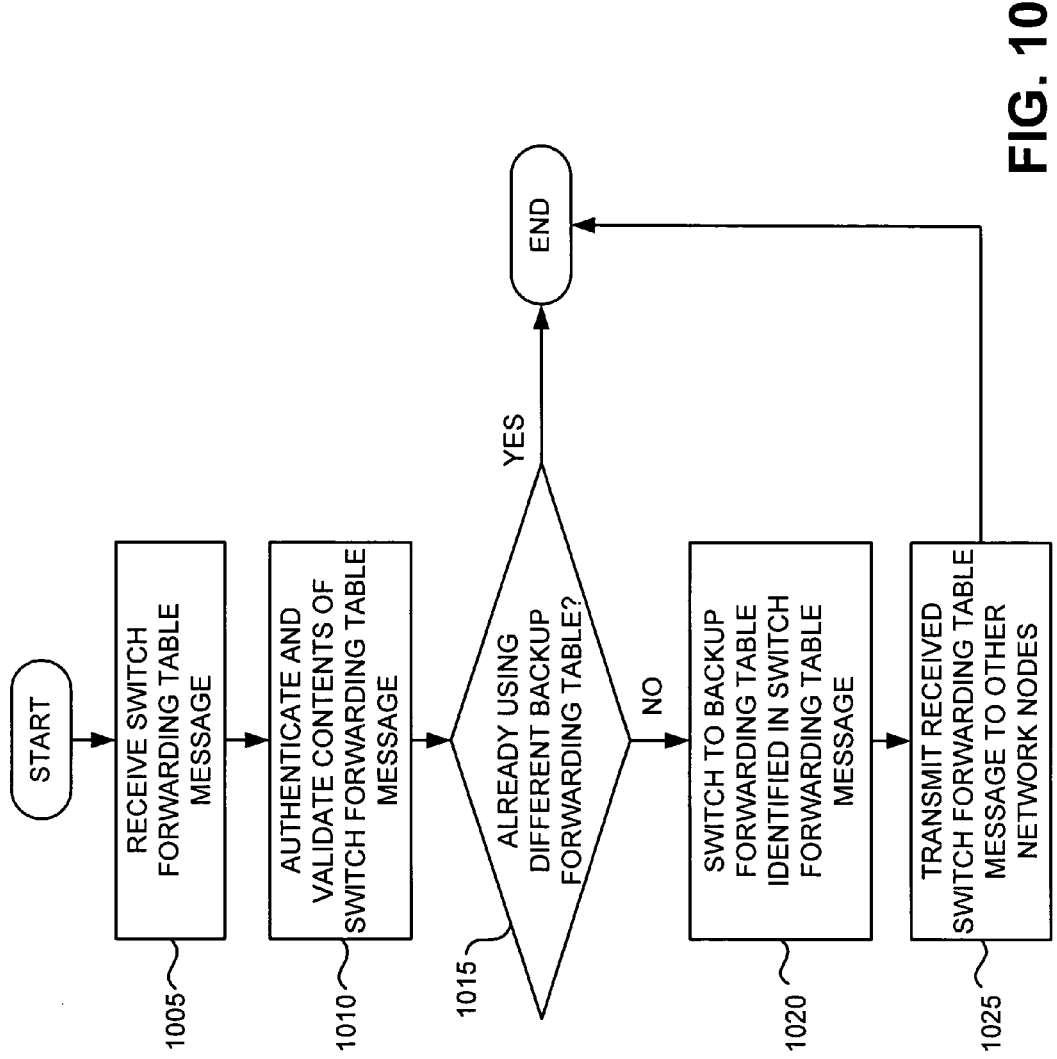
FIG. 10 illustrates an exemplary process, performed by a network node, in response to receiving a switch forwarding table message in an implementation consistent with the principles of the invention.

FIG. 10 illustrates an exemplary process, performed by a network node (e.g., a backbone satellite 110, a ground station 140, etc.), in response to receiving a switch forwarding table message 900 in an implementation consistent with the principles of the invention. Processing may begin with the network node receiving a switch forwarding table message 900 (act 1005). In response, the network node may authenticate and validate switch forwarding table message 900 (act 1010). To authenticate and validate switch forwarding table message 900, the network node may, for example, verify that the backup forwarding table identified in switch forwarding table message 900 exists.

The network node may determine if it is already using a backup forwarding table 310 from its stored batch 300 of forwarding tables (act 1015). If the network node is already using a backup forwarding table 310, processing may end. On the other hand, if the network node is using its primary forwarding table 305, the network node may switch to backup forwarding table 305 identified in switch forwarding table message 900 (act 1020). For example, if switch forwarding message 900 identifies the originating node as node #I, the link as link #K, and the new quality of link #K as #L, the network node may switch to backup forwarding table #I-K-L.

The network node may disseminate received switch forwarding table message 900 to other nodes in network 100 to implement this change throughout network 100 (act 1025). In general, the dissemination can be to some subset of the nodes in network 100, or to all nodes. In one implementation, a reliable flooding technique may be used for disseminating switch forwarding table message 900 throughout network 100. In some implementations consistent with the principles of the invention, a network node may piggy-back switch forwarding table message 900 with datagrams (or other data units, such as packets, cells, etc.) scheduled to be forwarded to other nodes. In this way, other nodes in network 100 will learn of the change in forwarding tables just as quickly as the nodes receive the datagrams being forwarded along the new path, and can adjust their forwarding tables immediately before even processing the datagram. Thus, the network node may immediately start forwarding datagrams along the revised path, without any time lag whatsoever. In essence, the datagrams themselves can carry the information needed to find the new path after a fault has occurred.

CONCLUSION

Implementations consistent with the principles of the invention ensure continued operation of a communications network when one or more events (e.g., link failure or degradation) occur in the communications network. To ensure the continued operation of the network, each node in the network stores a group of backup forwarding tables. When an event occurs, the nodes may switch to one of the backup forwarding tables and continue to route data based on the backup forwarding table.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above description focused on a satellite-based network, implementations consistent with the principles of the invention are not so limited. In fact, implementations consistent with the principles of the invention are equally applicable to terrestrial networks where continued routing of data upon the occurrence of events is desired.

While series of acts have been described with regard to FIGS. 6, 8, and 10, the order of the acts may be varied in other implementations consistent with the present invention. Moreover, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A communications network comprising:
    at least one control station configured to:
        generate batches of forwarding tables, each batch of forwarding tables including a primary forwarding table and a plurality of backup forwarding tables, and
        forward the batches of forwarding tables; and
    a plurality of network nodes, each network node being associated with one or more outbound and inbound links and configured to:
        receive a batch of forwarding tables from the at least one control station,
        install the primary forwarding table from the batch as a current forwarding table,
        detect that a quality of one of an associated outbound and inbound link has changed,
        in response to detecting the quality change, generate a message instructing other nodes of the plurality of network nodes to switch to a backup forwarding table associated with the detected link, the backup forwarding table being selected from the plurality of backup forwarding tables received at each respective node, and
        transmit the message to the other nodes.

2. The communications network of claim 1 wherein the message identifies the backup forwarding table.

3. The communications network of claim 1 wherein the message identifies the one outbound or inbound link, and
    wherein the backup forwarding table corresponds to the one outbound or inbound link.

4. The communications network of claim 1 wherein each of the plurality of network nodes is further configured to:
    transmit the message to the at least one control station.

5. The communications network of claim 1 wherein the plurality of network nodes includes at least one satellite.

6. The communications network of claim 5 wherein the at least one control station includes a terrestrial control station.

7. The communications network of claim 5 wherein the at least one control station includes a space-based control station.

8. A control station in a communications network comprising a plurality of nodes, the control station comprising:
a memory configured to store topology information for the communications network; and
a processor configured to:
generate a batch of forwarding tables for each of the plurality of nodes based on the topology information, each batch of forwarding tables including a primary forwarding table and a plurality of backup forwarding tables for a corresponding one of the plurality of nodes,
cause each batch of forwarding tables to be transmitted to the corresponding one of the plurality of nodes, and
receive a message from at least one of the plurality of the nodes that identifies a link, the message instructing other nodes in the network to switch to one of the plurality of backup forwarding tables associated with the link at each respective node.

9. The control station of claim 8 wherein the plurality of backup forwarding tables of each batch of forwarding tables allows the corresponding node to handle a subset of all single events that can occur in the communications network.

10. The control station of claim 8 wherein the plurality of backup forwarding tables of each batch of forwarding tables allows the corresponding node to handle any single event that can occur in the communications network.

11. The control station of claim 8 wherein the plurality of backup forwarding tables of each batch of forwarding tables allows the corresponding node to handle any combination of two or more events that can occur in the communications network.

12. The control station of claim 8 wherein the plurality of nodes includes at least one satellite.

13. The control station of claim 8 wherein the batch of forwarding tables includes forwarding tables for at least one of Internet Protocol, Asynchronous Transfer Mode, Multi-Protocol Label Switching, fast packet switching, and Ethernet.

14. In a communications network, a node that routes data in the communications network, comprising:
a memory configured to store a first primary forwarding table and a first plurality of backup forwarding tables; and
a processor configured to:
receive a batch of forwarding tables from a remote network device, the batch of forwarding tables including a second primary forwarding table and a second plurality of backup forwarding tables,
install the second primary forwarding table as a current primary forwarding table, and
replace the first plurality of backup forwarding tables with the second plurality of backup forwarding tables from the received batch.

15. The node of claim 14 wherein the node includes a satellite.

16. The node of claim 14 wherein the second plurality of backup forwarding tables allows the node to continue routing data in the communications network when any of a subset of possible events occurs in the communications network.

17. The node of claim 14 wherein the second plurality of backup forwarding tables allows the node to continue routing data in the communications network when a single event occurs in the communications network.

18. The node of claim 14 wherein the second plurality of backup forwarding tables allows the node to continue routing data in the communications network when a combination of two or more events occurs in the communications network.

19. The node of claim 14 wherein the node is associated with at least one outbound link and at least one inbound link, and
wherein the processor is further configured to:
detect a change in quality in one of the at least one outbound link and the at least one inbound link,
generate a message that identifies the detected one outbound link or inbound link, and
cause the message to be transmitted to one or more other nodes in the communications network, the message instructing the one or more other nodes to switch to a backup forwarding table associated with the identified one outbound link or inbound link, the backup forwarding table being selected from the first or the second plurality of backup forwarding tables.

20. The node of claim 14 wherein the processor is further configured to:
receive a message from another node in the communications network, the message instructing the node to switch to one of the plurality of second backup forwarding tables,
determine whether the second primary forwarding table is a current forwarding table in the node in response to receiving the message, and
cause the one second backup forwarding table to be the current forwarding table when the current forwarding table is the second primary forwarding table.

21. The node of claim 20 wherein the processor is further configured to:
cause the received message to be transmitted to at least one other node in the communications network.

22. The node of claim 20 wherein the processor is further configured to:
piggy-back the received message in a transmission to at least one other node in the communications network.

23. In a communications network, a node, associated with at least one outbound link and at least one inbound link, that transmits data in the communications network, the node comprising:
a memory configured to store a primary forwarding table and a plurality of backup forwarding tables; and
a processor configured to:
detect a change in quality in one of the at least one outbound link and the at least one inbound link,
generate a message that identifies the detected one outbound link or inbound link, and
cause the message to be transmitted to one or more other nodes in the communications network, the message instructing the one or more other nodes to switch to a backup forwarding table associated with the identified one outbound link or inbound link, the backup forwarding table being selected from the plurality of backup forwarding tables stored at each respective node.

24. The node of claim 23 wherein the plurality of backup forwarding tables allows the node to continue routing data in the communications network when any of a subset of possible events occurs in the communications network.

25. The node of claim 23 wherein the plurality of backup forwarding tables allows the node to continue routing data in the communications network when a single event occurs in the communications network.

26. The node of claim 23 wherein the plurality of backup forwarding tables allows the node to continue routing data in the communications network when a combination of two or more events occurs in the communications network.

27. The node of claim 23 wherein the processor is further configured to:
receive a second message from another node in the communications network, the second message instructing the node to switch to one of the plurality of backup forwarding tables,
determine whether the primary forwarding table is a current forwarding table in the node in response to receiving the second message, and
cause the one backup forwarding table to be the current forwarding table when the current forwarding table is the primary forwarding table.

28. The node of claim 27 wherein the processor is further configured to: cause the received second message to be transmitted to at least one other node in the communications network.

29. The node of claim 27 wherein the processor is further configured to:
piggy-back the received second message in a transmission to at least one other node in the communications network.

30. A method for routing data in a communications network that comprises a plurality of nodes, comprising:
generating, for each of the plurality of nodes, a unique set of forwarding tables, the unique set of forwarding tables including a primary forwarding table and a plurality of backup forwarding tables;
forwarding the unique set of forwarding tables to each of the plurality of nodes, the plurality of backup forwarding tables allowing each of the plurality of nodes to continue routing data in the communications network after an occurrence of at least one event, and
receiving a message from at least one of the plurality of the nodes that identifies a link, the message instructing other nodes in the network to switch to one of the plurality of backup forwarding tables associated with the link at each respective node.

31. The method of claim 30 wherein the plurality of backup forwarding tables allows each of the plurality of nodes to continue routing data in the communications network when any of a subset of possible events occurs in the communications network.

32. The method of claim 30 wherein the plurality of backup forwarding tables allows each of the plurality of nodes to continue routing data in the communications network when a single event occurs in the communications network.

33. The method of claim 30 wherein the plurality of backup forwarding tables allows each of the plurality of nodes to continue routing data in the communications network when a combination of two or more events occurs in the communications network.

34. The method of claim 30 wherein at least one of the plurality of nodes includes a satellite.

35. A computer-readable medium containing a plurality of instructions that, when executed by at least one processor, causes the at least one processor to perform a method for routing data in a communications network, comprising:
generating, for each of a plurality of network nodes, a set of forwarding tables, the set of forwarding tables including a primary forwarding table and a plurality of backup forwarding tables;
forwarding the set of forwarding tables to each of the plurality of nodes, the plurality of backup forwarding tables allowing each of the plurality of nodes to continue routing data in the communications network following a failure of or degradation in a network node or link, and
receiving a message from at least one of the plurality of the nodes that identifies a link, the message instructing other nodes in the network to switch to one of the plurality of backup forwarding tables associated with the link at each respective node.

36. A method for routing data in a communications network, the method comprising:
receiving a group of forwarding tables, the forwarding tables including a primary forwarding table and a plurality of backup forwarding tables;
installing the primary forwarding table as a current forwarding table for routing data in the communications network;
storing the plurality of backup forwarding tables;
detecting a change in quality in an outbound or inbound link associated with a node in the network;
in response to detecting the quality change, generating a message that identifies the detected link; and
transmitting the message to one or more other nodes in the communications network, the message instructing the one or more other nodes to switch to a backup forwarding table associated with the detected link.

37. The method of claim 36 wherein the plurality of backup forwarding tables enables continued routing of data in the communications network when a failure or a degradation of a link occurs in the communications network.

38. The method of claim 36 wherein the plurality of backup forwarding tables enables continued routing data in the communications network when any of a subset of possible events occurs in the communications network.

39. The method of claim 36 wherein the plurality of backup forwarding tables enables continued routing data in the communications network when a combination of two or more events occurs in the communications network.

40. A computer-readable medium containing a plurality of instructions that, when executed by at least one processor, causes the at least one processor to perform a method for routing data in a communications network, comprising:
receiving a group of forwarding tables, the forwarding tables including a primary forwarding table and a plurality of backup forwarding tables;
installing the primary forwarding table as a current forwarding table for routing data in the communications network; and
storing the plurality of backup forwarding tables;
detecting a change in quality in an outbound or inbound link associated with a node in the network;
in response to detecting the quality change, generating a message that identifies the detected link; and
transmitting the message to one or more other nodes in the communications network, the message instructing the one or more other nodes to switch to a backup forwarding table associated with the detected link.

41. In a node comprising at least one outbound link and at least one inbound link, a method for routing data in a communications network, comprising:

receiving a group of forwarding tables, the forwarding tables including a primary forwarding table and a plurality of backup forwarding tables;

detecting a change in quality of one of the outbound link and the inbound link;

generating a message in response to the detecting, the message identifying the one outbound or inbound link; and transmitting the message to at least one other node in the communications network, the message causing the at least one other node to switch to a backup forwarding table associated with the identified one outbound or inbound link.

42. The method of claim 41 wherein the message further identifies the node and the change in quality.

43. The method of claim 42 wherein the backup table is further associated with the node and the change in quality.

44. The method of claim 41 wherein the transmitting includes:

piggy-backing the message in a transmission to the at least one other node.

45. A computer-readable medium containing a plurality of instructions that, when executed by at least one processor, causes the at least one processor to perform a method for routing data in a communications network, comprising:

receiving a group of forwarding tables, the forwarding tables including a primary forwarding table and a plurality of backup forwarding tables;

detecting a change from a first quality to a second quality of one of an outbound link and an inbound link;

generating a message in response to the detecting, the message identifying the one outbound or inbound link; and sending the message to nodes in the communications network, the message causing the nodes to switch to a backup forwarding table associated with the identified one outbound or inbound link.

46. The computer-readable medium of claim 44 wherein the message further identifies the second quality.

47. A system for routing data in a communications network, comprising:

means for receiving a group of forwarding tables, the forwarding tables including a primary forwarding table and a plurality of backup forwarding tables;

means for determining that a quality of one of an outbound link and an inbound link has changed;

means for generating a message in response to determining the quality change, the message identifying the one outbound or inbound link; and means for sending the message to at least one other node in the communications network, the message instructing the at least one other node to switch to a backup forwarding table associated with the identified one outbound or inbound link.

* * * * *

UNITED STATES PATENT AND TRADEMARK OFFICE
CERTIFICATE OF CORRECTION

| | | |
|---|---|---|
| PATENT NO. | : 7,668,083 B1 | Page 1 of 1 |
| APPLICATION NO. | : 10/694968 | |
| DATED | : February 23, 2010 | |
| INVENTOR(S) | : Brig Barnum Elliott | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1732 days.

Signed and Sealed this

Twenty-eighth Day of December, 2010

David J. Kappos
*Director of the United States Patent and Trademark Office*